United States Patent
Goodrum et al.

(10) Patent No.: US 10,362,375 B2
(45) Date of Patent: Jul. 23, 2019

(54) DISCOVERING CONNECTION OF PASSIVE CABLES

(71) Applicant: Hewlett Packard Enterprise Development LP, Houston, TX (US)

(72) Inventors: Alan L. Goodrum, Tomball, TX (US); Montgomery C. McGraw, Magnolia, TX (US); Kuang-Yi Wu, Plano, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/320,932

(22) PCT Filed: Jul. 8, 2014

(86) PCT No.: PCT/US2014/045679
§ 371 (c)(1),
(2) Date: Dec. 21, 2016

(87) PCT Pub. No.: WO2016/007133
PCT Pub. Date: Jan. 14, 2016

(65) Prior Publication Data
US 2017/0164077 A1    Jun. 8, 2017

(51) Int. Cl.
*H04L 12/12*    (2006.01)
*H04Q 11/00*    (2006.01)
(Continued)

(52) U.S. Cl.
CPC ......... *H04Q 11/0071* (2013.01); *H04L 12/12* (2013.01); *H04L 27/0002* (2013.01);
(Continued)

(58) Field of Classification Search
USPC ........................................................ 398/166
See application file for complete search history.

(56) References Cited

U.S. PATENT DOCUMENTS 6,154,447 A    11/2000   Vedder
6,353,614 B1 *  3/2002   Borella ............. H04L 29/12009
                                                    370/389
(Continued)

FOREIGN PATENT DOCUMENTS

JP          09026896       1/1997
WO      WO-2007059392      5/2007

OTHER PUBLICATIONS

Medhi, Von Neumann Architecture, 2012.*
(Continued)

*Primary Examiner* — Kenneth N Vanderpuye
*Assistant Examiner* — Jai M Lee
(74) *Attorney, Agent, or Firm* — Hewlett Packard Enterprise Patent Department

(57) ABSTRACT

In one example in accordance with the present disclosure, a system is provided. The system includes a first subsystem and a second subsystem, connectable to each other via a passive cable, and each connected to a high-level management tool. Each subsystem includes a signal driver/receiver capable of sending and receiving data and signals over the passive cable and a connection discovery engine to access low-level power up/down controls of the signal driver/receiver. The connection discovery engine is to, via physical layer communication, send a local unique identifier (ID) of the particular signal driver/receiver over the passive cable. The connection discovery engine is further to, via physical layer communication, receive, over the passive cable, a remote unique ID of the signal driver/receiver in the other connected subsystem. The connection discovery engine is further to send the local unique ID and the remote unique ID to the high-level management tool.

14 Claims, 4 Drawing Sheets

(51) Int. Cl.
  *H04L 12/26* (2006.01)
  *H04L 12/24* (2006.01)
  *H04L 27/00* (2006.01)

(52) U.S. Cl.
  CPC .......... *H04L 41/12* (2013.01); *H04L 43/0811* (2013.01); *H04L 43/10* (2013.01); *H04Q 2011/0083* (2013.01)

(56) References Cited

U.S. PATENT DOCUMENTS

| | | | | |
|---|---|---|---|---|
| 7,359,634 | B1* | 4/2008 | Meli | H04B 10/077 356/73.1 |
| 7,583,902 | B2 | 9/2009 | Draper et al. | |
| 7,957,296 | B2 | 6/2011 | Ben-Hamo | |
| 8,115,631 | B2 | 2/2012 | Lange et al. | |
| 8,509,621 | B2* | 8/2013 | Boertjes | H04J 14/0212 398/83 |
| 9,608,733 | B2* | 3/2017 | Pavlas | H04B 10/40 |
| 2002/0041337 | A1* | 4/2002 | Candelore | H04N 7/1675 348/591 |
| 2002/0171889 | A1* | 11/2002 | Takeuchi | H04B 10/077 398/34 |
| 2003/0059158 | A1 | 3/2003 | Lacey | |
| 2003/0113118 | A1* | 6/2003 | Bartur | H04B 10/0771 398/139 |
| 2004/0208641 | A1* | 10/2004 | Smeulders | H04B 10/0799 398/186 |
| 2006/0013149 | A1 | 1/2006 | Jahn et al. | |
| 2006/0106952 | A1* | 5/2006 | Bomhoff | H04L 29/12113 710/10 |
| 2006/0148279 | A1* | 7/2006 | German | H01R 13/465 439/49 |
| 2007/0094410 | A1 | 4/2007 | Voigt et al. | |
| 2008/0159738 | A1 | 7/2008 | Lavranchuk | |
| 2008/0181235 | A1 | 7/2008 | Cagno et al. | |
| 2008/0267620 | A1* | 10/2008 | Cole | H04B 10/0775 398/17 |
| 2009/0063662 | A1* | 3/2009 | Baker | H04L 41/0806 709/220 |
| 2010/0215359 | A1* | 8/2010 | Li | H04B 10/40 398/22 |
| 2011/0043333 | A1* | 2/2011 | German | H04Q 1/136 340/10.1 |
| 2011/0141943 | A1 | 6/2011 | Shifris et al. | |
| 2011/0239014 | A1* | 9/2011 | Karnowski | G06F 1/3209 713/320 |
| 2012/0020675 | A1 | 1/2012 | Chuang et al. | |
| 2012/0155867 | A1* | 6/2012 | Giessler | H04B 10/40 398/45 |
| 2013/0137291 | A1 | 5/2013 | Abuelsaad et al. | |
| 2013/0138839 | A1 | 5/2013 | Abuelsaad et al. | |
| 2013/0148976 | A1* | 6/2013 | Patel | H04B 10/25 398/116 |
| 2013/0198346 | A1* | 8/2013 | Jubran | H04L 41/12 709/220 |
| 2013/0339552 | A1 | 12/2013 | Wang | |
| 2014/0029934 | A1* | 1/2014 | Xia | H04B 10/0771 398/20 |
| 2014/0133846 | A1 | 5/2014 | Gao et al. | |
| 2015/0085994 | A1 | 3/2015 | Koyabe et al. | |
| 2015/0208146 | A1* | 7/2015 | Younce | H04Q 11/0066 398/21 |
| 2016/0021597 | A1 | 1/2016 | Hart et al. | |
| 2016/0191188 | A1* | 6/2016 | Butler | H04J 14/0212 398/48 |

OTHER PUBLICATIONS

Pachnicke, S., Fiber-Optic Transmission Netwrks, Signals and Communication Technology, 2012, Springer-Verlag Berlin Heidelberg, pp. 11-29.*
Bhattacharya, S. K., Basic Electrical and Electronics Engineering, 2012, Pearson, p. 644.*
Agnew, Grace, Digital Rights Management, 2008, Elsevier, p. 130.*
Fiber Optic Cable and Accessories, (Research Paper), Aug. 3, 2009, 11 Pages.
International Searching Authority, The International Search Report and the Written Opinion, dated Mar. 19, 2015, 11 Pages.
International Searching Authority, The International Search Report and the Written Opinion, PCT/US2014/045679, dated Mar. 27, 2015, 12 pages.
Wagner, R.E. et al., Automatic Discovery of Fiber Optic Structured Cabling Component Locations and Connectivity, (Research Paper), Oct. 5, 2011, 4 Pages.
International Preliminary Report on Patentability received for PCT Patent Application No. PCT/US2014/045679, dated Jan. 19, 2017, 9 pages.
International Preliminary Report on Patentability received for PCT Patent Application No. PCT/US2014/045670, dated Jan. 19, 2017, 8 pages.

* cited by examiner

DISCOVERING CONNECTION OF PASSIVE CABLES

BACKGROUND

Data centers are becoming more and more complex. For example, an increased number of components (e.g., computing devices, servers, enclosures, racks and the like) in data centers must be interconnected. These interconnections may be managed by data center operators, and this task may be very difficult in complex data centers. In some situations, these interconnects may be manually cabled, and manual cabling is prone to human errors.

BRIEF DESCRIPTION OF THE DRAWINGS

The following detailed description references the drawings, wherein.

DETAILED DESCRIPTION

Figure 1:
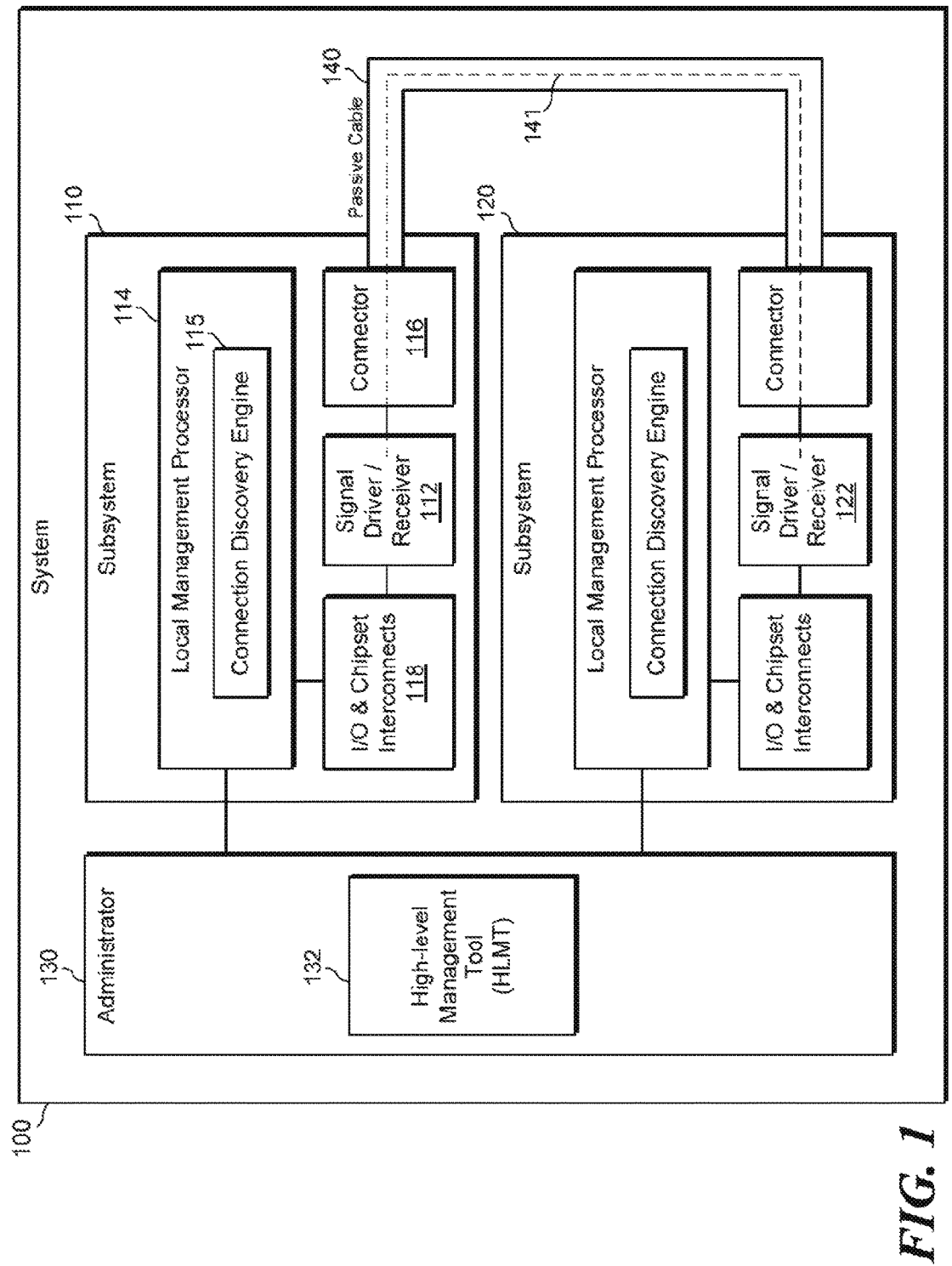
FIG. 1 is a block diagram of an example system for discovering connection of passive cables.

Managing interconnections in complex data centers may be made easier (e.g., for data center operators) if there is a way to provide assistance in reporting which components (e.g., computing devices, servers, enclosures, racks and the like) are connected. One solution to allow for such reporting assistance is to use "smart cables," for example, industry-standard CXP active optical cables. Each end of such a smart cable includes a microcontroller (the "smarts") that stores a unique ID of the cable and is capable of transmitting this unique ID to identify the cable to other data center components, for example, a high-level management tool capable of discovering that various components of a data center are connected to each other. However, in these solutions, for the high-level management tool to discover that two components are connected, it is critical that the cable connecting the two components be a smart cable. Such a solution does not work for passive or "dumb" cables. Smart cables are significantly more costly than passive cables, and they require larger connectors to include the "smarts." Additionally, smart cables consume power at the connector. In some server implementations (e.g., blade enclosures), these smart cables often must be plugged into the back of switch modules, which may be the hottest area of the enclosure. Thus, additional power consumption and heat output in this area is undesirable.

Another solution to help data center operators determine which components are connected is to use a mass-termination system. A mass-termination system is essentially a midplane (or like interconnect fabric) that has a finite number of hardwired interconnect paths between a number of endpoints. Then, a field programmable unit (e.g., an EEPROM) is programmed to indicate which endpoints should be connected via the interconnect paths. Such mass-terminations systems force the connections between the data center components to fit into a limited number of configurations. However, for increasingly complex data centers, the number of possible connection configurations for various components is so large that in many situations, it is not possible to develop a mass-termination implementation that satisfies enough configurations to be practical.

In different contexts, for example, power connectivity (e.g., discovering which server is plugged into which power circuit), some solutions may provide a way for one end of a cable to communicate an identifier to the other end of the cable. However, many of these solutions require a "side-band" communication link (e.g., a serial link) solely for the purpose of connection discovery. Side-band means, in short, that an additional link is required beyond the main link use for the primary purpose of the connection (e.g., power, data communication, etc.). Often these solutions require additional safeguards to ensure that the side-band link does not interfere with the main link, which adds cost, among other drawbacks.

Some example circuits are capable of communicating "extra" information over a cable, during normal data communication by altering the amplitude of a logic '1'.

The present disclosure describes discovering connection of passive cables, for example, a passive cable that connects a first subsystem and a second subsystem. Each subsystem may include a signal driver/receiver (e.g., an "off the shelf" signal driver/receiver) that has various low-level power up/down controls (e.g., an enable/disable input, a loss-of-signal output, etc.). The present disclosure describes accessing these low-level power up/down controls to perform physical layer communication over the passive cable, for example, over the same lines of the cable that are used for normal data communication (i.e., in-band). Such physical layer communication may be performed before normal data communication commences over the passive cable. Via this low-level communication, the subsystems may exchange unique IDs associated with their respective signal driver/receivers. Then, each subsystem may send its local unique ID and the received remote unique ID to a high-level management tool (HLMT) such that the HLMT can discover that the first subsystem and second subsystem are connected via the passive cable.

Because existing signal driver/receivers are used to drive signals over the passive cable, no active cable is required. Thus, no additional component or circuitry is needed to read a tag on an active cable. Nor is any additional piece of test equipment needed to drive an endpoint identifier over the cable for connection discovery purposes. In the present disclosure, it may be the case that the low-level signals in the signal driver/receiver are available "off the shelf," and these low-level signals may be accessed to drive signals over the cable. Thus, as long as a subsystem includes a single driver/receiver, it may take advantage of the solutions described herein. Still, even though an active cable is not required, by the exchange of identifiers (described in detail below), a high-level management tool is able to, in effect, create a single connection identifier for each end of the passive cable, and then compare these to determine that a connection exists.

FIG. 1 is a block diagram of an example system 100 for discovering connection of passive cables. System 100 may include two or more subsystems, and it may be desirable to connect a particular two of the subsystems (e.g., 110, 120) with a passive cable 140 such that the two subsystems can communicate with each other (e.g., network type communications). System 100 may include an administrator 130 that may be connected to any number of the subsystems in system 100, for example, to at least subsystem 110 and 120 as shown in FIG. 1. In some examples, system 100 may include a single enclosure (e.g., rack, chassis, etc.), and in other examples, system 100 may include multiple enclosures (e.g., with some subsystems in one enclosure and other subsystems in another enclosure). In the example of multiple enclosures, a single administrator (e.g., 130) may still be connected to and may still manage the multiple subsystems of system 100. In the example of multiple enclosures, a subsystem in one enclosure may still be connected (e.g., with a passive cable such as 140) to a subsystem in another enclosure.

Administrator 130 may be a computing device (e.g., a computing board or a module that plugs into a section of an enclosure such as a chassis) that allows for management of multiple subsystems from a common location, or even remotely. Administrator 130 may include its own processor and machine-readable storage medium for storing instructions executable by the processor. Administrator 130 (e.g., in conjunction with various local management processors such as 114 in the subsystems) may allow for performing various tasks with respect to the subsystems, for example, power up, reset, mounting drives, log viewing, and many more. In some examples, administrator 130 may be an onboard administrator. Administrator 130 may include a high-level management tool (HLMT) 132 that provides the bulk of the management functionalities just mentioned. HLMT 132 may include instructions (e.g., stored on the machine-readable storage medium) that, when executed (e.g., by the processor), implement the functionality of the HLMT. Alternatively or in addition, HLMT 132 may include electronic circuitry (i.e., hardware) that implements the functionality of the HLMT.

Subsystem 110 may be any type of computing device or multiple computing devices that are in communication with each other (e.g., via at least one connector or network) and are presented as a unified subsystem. Examples of subsystems include servers (e.g., blades), enclosures (e.g., chassis, racks), switches (and other networking components) and various other subsystems. Each subsystem of system 100 may be similar in many respects to subsystem 100. Thus, for simplicity, for the most part, only subsystem 100 will be described as an example subsystem, and it should be understood that other subsystems (e.g., 120) may include similar components and may operate in a similar manner.

Subsystem 110 may include a signal driver/receiver 112. Subsystem 110 may include a connection discovery engine 115, for example, implemented in a local management processor 114. It should be understood, however, that in other examples, connection discovery engine 115 may be implemented elsewhere, for example, in signal driver/receiver 112. In the examples where connection discovery engine 115 is implemented in local management processor 114, as shown in FIG. 1, signal driver/receiver 112 may be in communication with local management processor 114, for example, via various I/O and chipset interconnects 118. In this example, via local management processor 114, signal driver/receiver 112 may be in communication with administrator 130 (and with high-level management tool 132). It should be understood that signal driver/receiver 112 may be in communication with administrator 130 via some other path (e.g., circuits, interconnects, etc.) that does not go through a local management processor.

Local management processor 114 may be any type of management processor, for example, such as integrated lights-out (iLO), lights out manager or other type of out-of-band manager. Local management processor 114 may allow an administrator (e.g., 130) to perform various tasks with respect to the particular subsystem 110, for example, power up, reset, mounting drives, log viewing, and many more. Local management processor 114 may include its own processor and machine-readable storage medium for storing instructions executable by the processor. Local management processor 114 may be connected to signal driver/receiver 112 (e.g., via I/O and chipset interconnects 118). Local management processor 114 may (e.g., via firmware and/or software running on local management processor) be able to "see" signal driver/receiver 112, and may be able to access certain low-level power up/down controls of signal driver/receiver 112. These low-level controls are described in more detail below.

Signal driver/receiver 112 may be connected to passive cable 140, for example, via connector 116. Connector 116 may be a passive connector whose main purpose may be for mechanical cable connection.

Passive cable 140 may also be connected (e.g., manually by a data center operator) to another signal driver/receive (e.g., 122) in another subsystem (e.g., 120). Passive cable 140 may include at least one "line" (e.g., fiber, metal wire, etc.), where each line provides a single-bit data connection. The present disclosure will focus primarily on cable connection discovery using the same lines of passive cable 140 that are used for "normal data communication." In other words, the purpose of passive cable 140 (which connects subsystem 110 to subsystem 120) may be for the two subsystems to communicate data back and forth (e.g., network type communication). The present disclosure may use these same lines that are used for normal data communication for discovering that passive cable 140 has been connected between two subsystems (e.g., 110, 120). Thus, this type of connection discovery may be referred to as "in-band," as opposed to out of band where additional lines or paths may be added to support connection discovery. More broadly, this in-band concept may continue beyond the passive cable 140 itself. There may be a data communication path (e.g., 141 in FIG. 1), used for normal data communication, between signal driver/receiver 112 and signal driver/receiver 122. This path may include at least one line in passive cable 140 and also associated lines at the input/output of the signal driver/receivers and their associated connectors (e.g., 116). This same data path may be used for the low-level communications that are used for connection discovery, as described herein.

Passive cable 140, in various examples, may be different types of passive cables. For example, cable 140 may be an optical cable, in which case each line may be an optical fiber. Alternatively, passive cable 140 may include at least one metal line, for example, made of copper or other conductive metal. The type of passive cable used may determine what type of signal driver/receiver (e.g., 112) is used.

Signal driver/receiver 112 is able to drive signals (e.g., electrical signals, optical signals, etc.) across the at least one line of passive cable 140 and is able to detect signals sent to it across passive cable 140. If passive cable 140 is electrical (e.g., with metal lines), signal driver/receiver 112 may be an electrical signal driver/receiver. If passive cable 140 is optical, signal driver/receiver 112 may be an optical signal driver/receiver such as, for example, an electrical/optical engine (EO engine). An EO engine is a computer circuit that drives and receives optical signals, and may also convert electrical signals to optical signals and vice versa, for example, to interface between an optical passive cable (e.g., cable 140) and a larger electrical circuit.

Signal driver/receiver 112 may include its own processor and machine-readable storage medium for storing instructions executable by the processor. In some examples of the present disclosure (e.g., such as where connection discovery engine 115 is implemented in a local management processor 114), signal driver/receiver 112 may be more or less "off the shelf." Here, off the shelf means that whatever signal driver/receive is in subsystem 110 may be used to implement the solutions described herein without modification, as long as the signal driver/receive meets some requirements (see discussion of low-level power up/down controls below). This is, in fact, a significant benefit of the present disclosure, that existing signal driver/receivers (e.g., commonly used signal driver/receivers) and existing passive cables (e.g., commonly used passive cables) can be used to implement the solutions described herein.

Signal driver/receiver 112 may provide some low-level power up/down controls. These low-level controls may be hardware pins that are accessible external or internal to signal driver/receiver 112. In other examples, these low-level controls may not be directly associated with particular hardware pins. Via these controls, other components of subsystem 110 (e.g., local management processor 114) may be able to cause signal driver/receiver 112 to power up or power down. Additionally, via these controls, other components of subsystem 110 may be able to determine when signal driver/receive 112 is or is not receiving any sort of signal at its input/output. This input/output, in the example of FIG. 1, is depicted where signal driver/receiver 112 connects, e.g., via connector 116, to passive cable 140. In some examples where connection discovery engine 115 is implemented in signal driver/receiver 112, these low-level controls may be accessed from within signal driver/receiver 112 by connection discovery engine 115. It should be understood that the low-level power up/down controls, as referred to herein, are not limited to any type of physical control pins or the like. Instead, they should be interpreted as any manner for turning the signal driver/receiver on and off, and detecting the same. Thus, the use of the term "control" or the like should not be construed as limiting.

Signal driver/receiver 112, when it is powered up, but before normal data communication starts, may provide some sort of signal at its output. Such a signal may be a continuous logic '1' (high power state). Other power-on signal options are possible. Signal driver/receiver 112, when it is powered down or off, may provide no signal, for example, zero power at its output. Zero power may be a lower power level than the logic '0' used during normal data communication. Other power-off signal options are possible. At least one of the low-level power up/down controls (e.g., an "enable" control or a "disable" control) may be used to power up signal driver/receiver 112, thus causing a certain signal (e.g., continuous logic '1') or may be used to power down signal driver/receiver 112, thus causing a no signal (e.g., zero power). As one example, at least one of these low-level power up/down controls may be used to modulate or toggle signal driver/receiver 112 between a high power and zero power output state, in order to send signals (e.g., a multi-bit message or identifier) over at least one line of passive cable 140. One example benefit of modulating between a high power and zero power state is that this does not required the discrimination of two relatively close logic voltages (i.e., logic '1' versus logic '0'), like those used for normal data communication. Another example benefit is that the same power level threshold detection circuits in the signal receiver that are used to detect loss of signal may be reused. Another example benefit is that an unmodified signal driver may be used for both normal data communication and for sending unique IDs. In one example, local management processor 114 (e.g., via connection discovery engine 115) may cause the modulation described above. In other examples, a connection discovery engine implemented in signal driver/receiver 112 may cause such modulation.

Such a modulated signal may be interpreted by the amounts of time that the power level of a line is high power vs. zero power, for example. Thus, in effect, at least one line of passive cable 140 may act as a serial communication line where the high power state is a logic '1' and the zero power state is a logic '0'. In order for signals to be sent and received in the serial manner described, each end of the passive cable (e.g., in connection discovery engine 115) may need to use a common signal cycle time so that it can be determined how many '0' and '1' bits are sent over a certain timeframe, in order to generate and decipher a multi-bit message or identifier (e.g., the beacons and unique IDs discussed herein). It should be understood that this high-power and zero-power communication "protocol" may be used during cable connection discovery only, and different power levels and protocols may be used during normal data communication.

Signal driver/receiver 112, when no signal (zero power) is present at its input, may assert or de-assert (depending on configuration) at least one of the low-level power up/down controls (e.g., a loss-of-signal (LOS) control). As one example, at least one of these low-level power up/down controls may be used to monitor the timing of transitions between when no signal (zero power) is present at its input and when there is a signal. In this manner, even before normal data communication over passive cable 140 begins, at least one of these low-level power up/down controls may be used to receive signals over at least one line of passive cable 140. For example, if signal driver/receiver 112 is used to toggled between a high power and no power state to send a signal (as described above), then signal driver/receiver 122 may be used to receive this signal by monitoring the timing of transitions between when no signal (zero power) is present at its input and when there is a signal, and likewise if signal driver/receiver 122 sends a signal to signal driver/receiver 112. In one example, local management processor 114 (e.g., via connection discovery engine 115) may monitor such transitions to receive signals. In other examples, a connection discovery engine implemented in signal driver/receiver 112 may monitor such transitions to receive signals.

As mentioned herein, passive cable may include one line or multiple lines. In various examples with multiple lines, the low-level power up/down controls of the signal driver/receiver may control or drive these multiple lines in various ways. For example, a single enable or disable control may cause the signal driver/receiver to control all the lines at once (e.g., all switching to high power or no power together). Alternatively, each line may be controlled separately. For example, a signal driver/receiver may have an enable or disable register with enough bits to account for each line. Various other ways of controlling multiple lines may exist as well. Likewise, a loss-of-signal (LOS) control may make a "signal lost" determination for all of the lines together (e.g., all lines must have a loss of signal, or any one of the lines has a loss of signal). Alternatively, each line could have its own LOS control. For simplicity, various descriptions herein may refer to a single enable or disable control and a single LOS control which presumably control or interpret all the lines together. However, it should be understood that other contemplated embodiments cover these other control situations just described.

The descriptions provided above of using low-level power up/down controls to send and receive signals is an example of communicating via the physical layer. The term "physical layer" (or PHY) refers to part of the Open Systems Interconnection (OSI) model, which is a model that characterizes and standardizes the internal functions of communication systems. The physical layer of the OSI model is the first or lowest layer. The physical layer consists of the basic networking hardware transmission technologies of a network. The physical layer defines the means of transmitting raw bits rather than logical data packets over a physical link. In the above examples, because low-level power up/down controls are used to send signals by powering up and power down signal driver/receiver 112, such signals are sent without regard to whatever communication protocol the signal driver/receiver 112 uses once it is operating in its normal data communication mode. This is a significant benefit of the present disclosure, that the solutions described herein may be used to discover when passive cables are connected, irrespective of the communication protocol used by the signal driver/receiver during its normal data communication mode.

Connection discovery engine 115 may access the low-level power up/down controls of signal driver/receiver 112 described above. Connection discovery engine 115 may be implemented in local management processor 114, in which case, connection discovery engine 115 may access the low-level controls via local management processor 114. In alternate embodiments, connection discovery engine 115 may be implemented in signal driver/receiver 112 and may access the low-level power controls internal to signal driver/receiver 112. Thus, in these embodiments, these low-level controls may not need to be accessible external to the signal driver/receiver 112 (e.g., no external connections). In yet other embodiments, connection discovery engine 115 may be implemented in other locations, for example, in high-level management tool 132, or elsewhere in subsystem 110.

Connection discovery engine 115 may include instructions (e.g., stored on a machine-readable storage medium) that, when executed by a processor, implement the functionality of connection discovery engine 115. Such machine-readable storage medium and processor may be the ones located in local management processor 114, e.g., in the example where connection discovery engine 115 is implemented in local management processor 114. Alternatively, such machine-readable storage medium and processor may be the ones located in signal driver/receiver 112, e.g., in the example where connection discovery engine 115 is implemented in signal driver/receiver 112. Alternatively, such machine-readable storage medium and processor may be yet other ones, for example, located in administrator 130 or elsewhere in subsystem 110. In some examples, instead of, or in conjunction with, connection discovery engine 115 being instructions executed by a processor, connection discovery engine 115 may include electronic circuitry (i.e., hardware) that implements the functionality of connection discovery engine 115.

Connection discovery engine 115 may be responsible for causing low-level power up/down controls of signal driver/receiver 112 to modulate to send signals (for cable connection discovery purposes) and to monitor timings of transitions on low-level power up/down controls to receive signals. In order to provide a clearer description of connection discovery engine 115, various descriptions herein may refer to the connection discovery engine 115 "sending" and "receiving." It should be understood that in order to send and receive, connection discovery engine 115 may modulate these low-level controls (send) and monitor timings of transitions on these low-level controls (receive). Additionally, it should be understood that sending refers to causing one signal driver/receiver (e.g., 112) to send signals (e.g., multi-bit messages or identifiers) over passive cable 140 to another signal driver/receiver (e.g., 122) in another subsystem, and likewise in reverse for receiving.

Connection discovery engine 115 may send a unique identifier (ID) (i.e., local unique ID) associated with signal driver/receiver 112. Likewise, connection discovery engine 115 may receive a unique ID (i.e., remote unique ID) associated with another signal driver/receiver (e.g., 122) in another subsystem connected by passive cable 140. In other words, subsystems 110 and 120 (via their connection discovery engines) may exchange local unique IDs. These IDs may be used to produce, on each end of cable 140, a single connection identifier that indicates the connection of subsystem 110 to subsystem 120. Then, high-level management tool 132 may compare the single connection identifiers from subsystem 110 and subsystem 120 to determine that these two subsystems are connected (by passive cable 140). More details about creating this single connection identifier are provided below.

Connection discovery engine 115 may determine the local unique ID in various ways. For example, it may query signal driver/receiver 112 for this ID. In these examples, signal driver/receiver 112 may need to be able to store and communicate a unique ID to other components of subsystem 110. Various "off the shelf" signal driver/receivers may have this capability. Connection discovery engine 115 may communicate its local unique ID and the received remote unique ID to high-level management tool 132 (e.g., via local management processor 114). Connection discovery engine 115 may send these IDs as the single connection identifier, or the single connection identifier may be created in HLMT 132 after receiving the local and remote unique IDs.

High-level management tool (HLMT) 132 may receive or create a single connection identifier for each end of cable 140 (i.e., for subsystem 110 and subsystem 120). The single connection identifiers uniquely identify the connection of subsystem 110 to subsystem 120. The single connection identifier may be created by combining the local unique IDs of each subsystem (each associated with the signal driver/receiver in each subsystem). For example, for subsystem 110, HLMT 132 may receive, from connection discovery engine 115, a local unique ID and a remote unique ID, and may concatenate these two IDs to create a first single connection identifier. Then, for subsystem 120, HLMT 132 may receive, from the connection discovery engine in subsystem 120, a local unique ID and a remote unique ID, and may concatenate these two IDs to create a second single connection identifier. HLMT 132 may then compare the first and the second single connection identifier, and if they match, HLMT 132 may determine that subsystem 110 is connected to subsystem 120 (by passive cable 140).

In order to perform matching of single connection identifiers, HLMT 132 may flip the local and remote unique IDs received from one of the subsystems. For example, if HLMT 132 receives, respectively, local and remote IDs of "123" and "789" from subsystem 110, and receives, respectively, local and remote IDs of "789" and "123" from subsystem 120, HLMT may need to flip the IDs from one of the subsystems, for example, to get a consistent ID ordering. Thus, for example, HLMT could flip the IDs received from subsystem 120 to get "123789." and then the single connection identifiers would match. Such concatenation and/or ID flipping described above could be done either in HLMT 132 or in the subsystems before sending to HLMT. Other manners of discovering a match given potentially different orderings of unique ideas maybe used as well.

Connection discovery engine 115 may also send connection probes or "beacons" using the same low-level controls described above. Likewise, connection discovery engine 115 may receive connection probes or "beacons" using the same low-level controls described above. Beacons may be used to determine that there is "something" connected on the other end of passive cable 140. A connection discovery engine (e.g., 115) may determine that another subsystem is connected over passive cable 140 before it begins the routine of exchanging unique local IDs. In some examples, as soon as subsystem 110 (specifically, connection discovery engine 115 and signal driver/receiver 112) is powered up, it may automatically start to send beacons and start to listen for beacons. Even when subsystems are started up, beacons may not successfully travel between subsystems, for example, if passive cable 140 is not yet connected. However, the process of sending and listening for beacons may continually run such that it is ready to send and receive beacons when cable 140 is connected. Thus, as soon as passive cable 140 is connected between subsystem 110 and 120, each subsystem may start to send and receive beacons.

In some situations, signal driver/receiver 112 may be sending beacons while there is no subsystem connected to the other end of passive cable 140. In these situations, if signal driver/receiver 112 is optical (e.g., an EO engine) and if passive cable 140 is optical, as beacons are sent, light or laser beams may be shooting out of the non-connected end of passive cable 140. There is a risk that these light or laser beams may be damaging to humans, for example, to eyes. Thus, in some optical examples, the beacons (and perhaps other types of signals) may be low power. A low power optical signal may be created by modulating the signal driver/receiver (e.g., between high power and zero power) such that the amount of time that the high power state is on is limited. For example, beacons may be created by using a simple toggling pattern for several bit times. An optical signal could also be limited in power by limiting the number of lines (in a multi-line cable) that are high power at any one time. In short, in some embodiments, low power optical beacons may be used.

Figure 2:
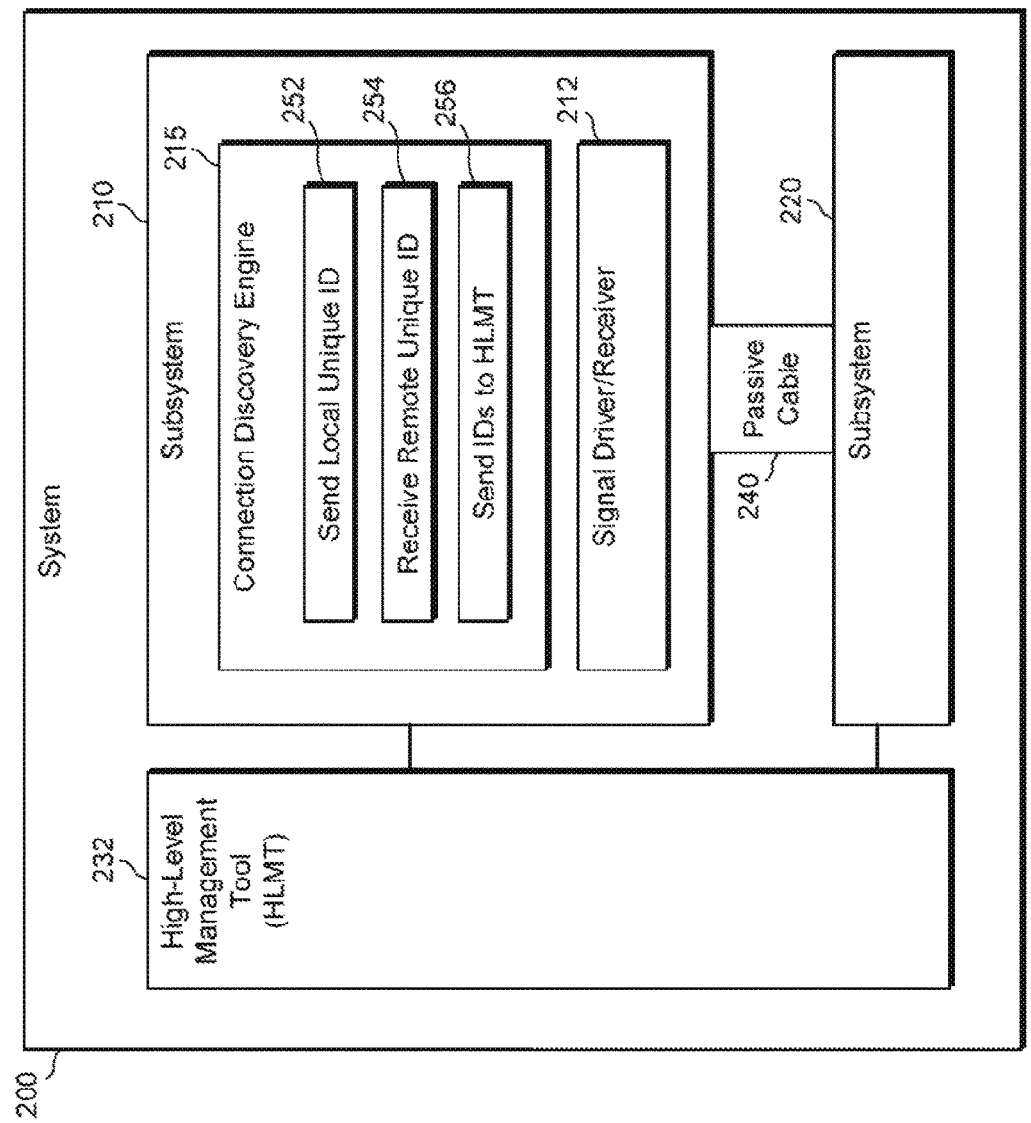
FIG. 2 is a block diagram of an example system capable of discovering connection of passive cables.

FIG. 2 is a block diagram of an example system 200 capable of discovering connection of passive cables. System 200 may be similar to system 100 of FIG. 1. System 200 may include a first subsystem 210 (e.g., similar to subsystem 110) and a second subsystem 220 (e.g., similar to subsystem 120). Subsystem 220 may be substantially similar to subsystem 210; therefore, system 210 only may be described as an example. Subsystems 210 and 220 may be connected (or connectable) by a passive cable 240 (e.g., similar to passive cable 140). System 200 may include a high-level management tool (HLMT) 232 (e.g., similar to HLMT 132). HLMT 132 may be in communication with subsystem 210 and with subsystem 220, in particular, with the connection discovery engine (e.g., 215) in each subsystem.

Subsystem 210 may include a signal driver/receiver 212 (e.g., similar to 112) and a connection discovery engine 215 (e.g., similar to 115 of FIG. 1). Signal driver/receiver 212 is capable of sending and receiving data and signals over passive cable 240. As described above, signal driver/receiver 212 can send and receive data in a "normal data communication" mode and can send and receive signals outside of normal data communication mode using low-level power up/down controls. Connection discovery engine 215 may access low-level power up/down controls of signal driver/receiver 212 to cause signals to be sent outside of normal data communication mode (i.e., via physical layer communication, as described above), to send and receive unique IDs. Specifically, connection discovery engine 215 may cause a local unique ID of the particular signal driver/receiver to be sent over passive cable 240, as shown by label 252 in FIG. 2. Additionally, connection discovery engine 215 may receive, over passive cable 240, a remote unique ID of the signal driver/receiver in the other connected subsystem, as shown by label 254. Connection discovery engine 215 may also send the local unique ID and the remote unique ID to high-level management tool 232, such that HLMT 232 may determine that subsystem 210 and subsystem 220 are connected via passive cable 240, as described in more detail above.

Figure 3:
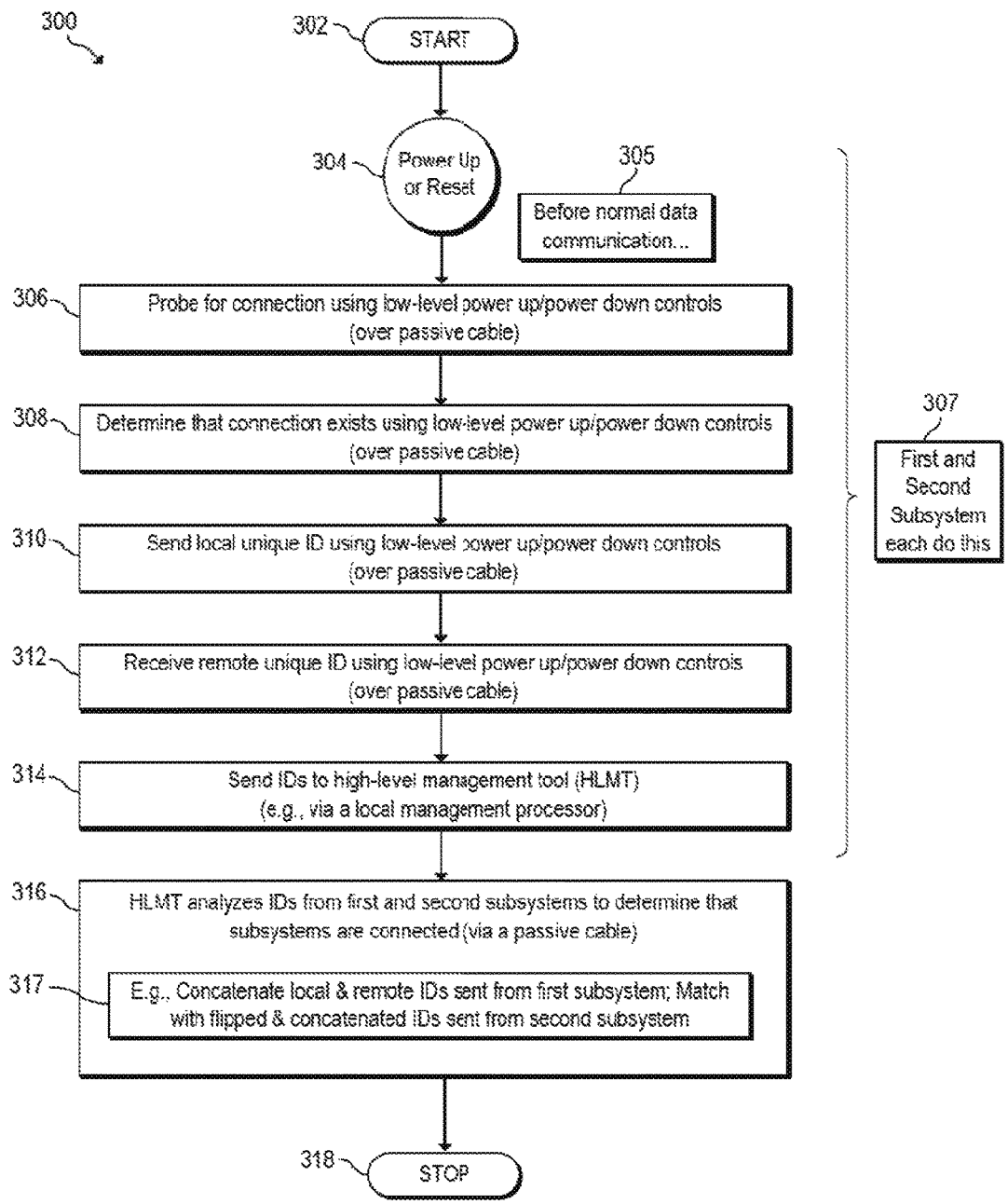
FIG. 3 is a flowchart of an example method for discovering connection of passive cables.

FIG. 3 is a flowchart of an example method 300 for discovering connection of passive cables. Method 300 may be described below as being executed or performed by a system, for example, system 100 of FIG. 1 or system 200 of FIG. 2. Other suitable systems may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate embodiments of the present disclosure, one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where components of the system (e.g., 100 or 200) may power up or reset. In particular, a first subsystem (e.g., 110 or 210) and a second subsystem (e.g., 120 or 220) may power up or reset. Note 305 shown in FIG. 3 indicates that the remainder of the steps (related to connection discovery) in method 300 may occur before normal data communication occurs (e.g., data communication over passive cable 140 that is related to the ultimate purpose of passive cable 140). Note 307 shown in FIG. 3 indicates that steps 304 to 312 occur on each of at least two subsystems (e.g., 110 and 120; or 210 and 220), for example, primarily in the connection discovery engine of each subsystem. For simplicity, steps 304 to 312 will be described with regard to just one of these subsystems (first subsystem), but it should be understood that the other subsystem (second subsystem) may proceed in a similar manner.

At step 306, the first subsystem (e.g., 110, via connection discovery engine 115; or 210 via connection discovery engine 215) may probe for a connection (via the passive cable) with another subsystem. Such probing may be done using beacons as described above, where such beacons may be sent and received using the low-level power up/down controls. At step 308, the first subsystem may determine that a connection with the second subsystem exists. At step 310, the first subsystem may send its local unique ID to the second subsystem. Such sending of the local unique ID may be done, as described above, using the low-level power up/down controls. At step 312, the first subsystem may receive the remote unique ID of the second subsystem. Such receiving of the remote unique ID may be done, as described above, using the low-level power up/down controls. It should be understood that steps 310 and 312 may occur in an opposite order, for example, depending on which subsystem (first or second) successfully confirms a probe or beacon first. For example, if the first subsystem receives and confirms a beacon from the second subsystem before the opposite situation, then the first subsystem may send its local unique ID first, and the second subsystem may receive the remote local ID first, and then respond by sending its local unique ID.

At step 314, the first subsystem (and the second subsystem as well) may send its local unique ID and the received remote unique ID to a high-level management tool (HLMT) (e.g., 132). For example, as described above, these IDs may be sent via a local management processor in the subsystem or otherwise. At step 316, the HLMT may analyze the IDs from each of the first and second subsystem to determine that the subsystems are connected (via the passive cable). Such a determination may be made in a manner similar to that described above, for example, by concatenating local and remote IDs sent from each subsystem to create a single connection identifier for each subsystem (e.g., flipping the local and remote IDs for one of the subsystems), and then comparing the single connection identifiers (see example 317 of FIG. 3). Method 300 may eventually continue to step 318, where method 300 may stop.

Figure 4:
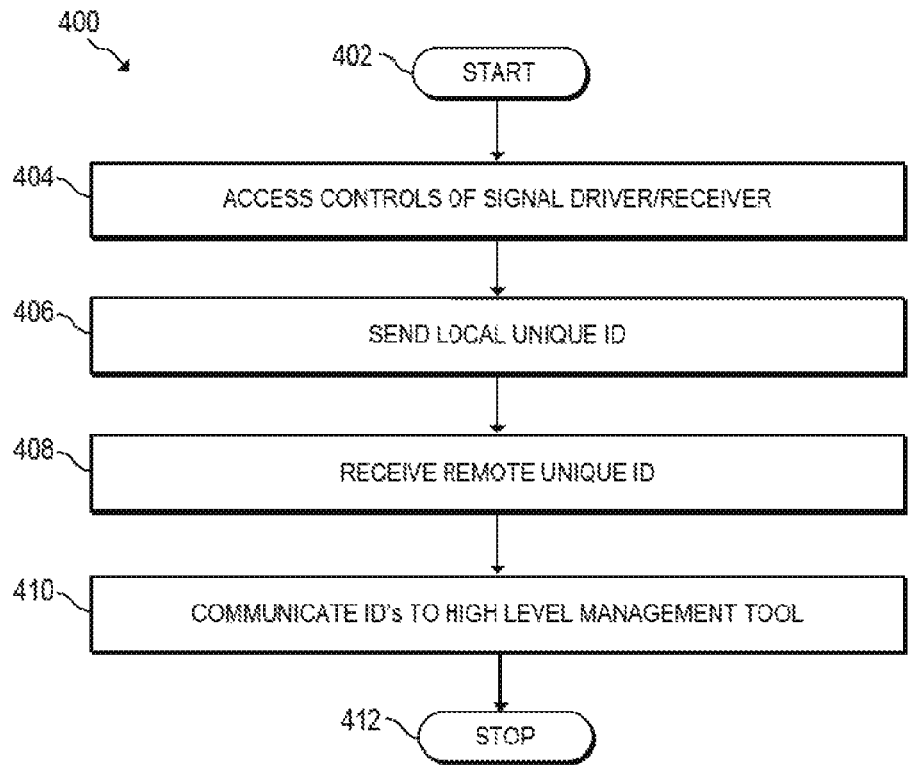
FIG. 4 is a flowchart of an example method for discovering connection of passive cables.

FIG. 4 is a flowchart of an example method 400 for discovering connection of passive cables. Method 400 may be described below as being executed or performed by a system, for example, system 500 of FIG. 5, system 100 of FIG. 1 or system 200 of FIG. 2. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where the system may access controls of a signal driver/receiver in a first subsystem, wherein the signal driver/receiver is capable of sending and receiving data and signals over a passive cable to a connected second subsystem. At step 406, the system may send a local unique ID of the signal driver/receiver of the first subsystem over the passive cable to the second subsystem. At step 408, the system may receive, over the passive cable, a remote unique ID of a signal driver/receiver in the second subsystem. The sending and receiving may be performed via physical layer communication using the controls. The local unique ID may be sent and the remote unique ID may be received over the passive cable "in-band", using at least one line of the passive cable that is also used to send and receive data during normal data communication. At step 410, the system may communicate the local unique ID and the remote unique ID to a high-level management tool. The first and second subsystem may each be connected to the high-level management tool. Method 400 may eventually continue to step 412, where method 400 may stop.

Figure 5:
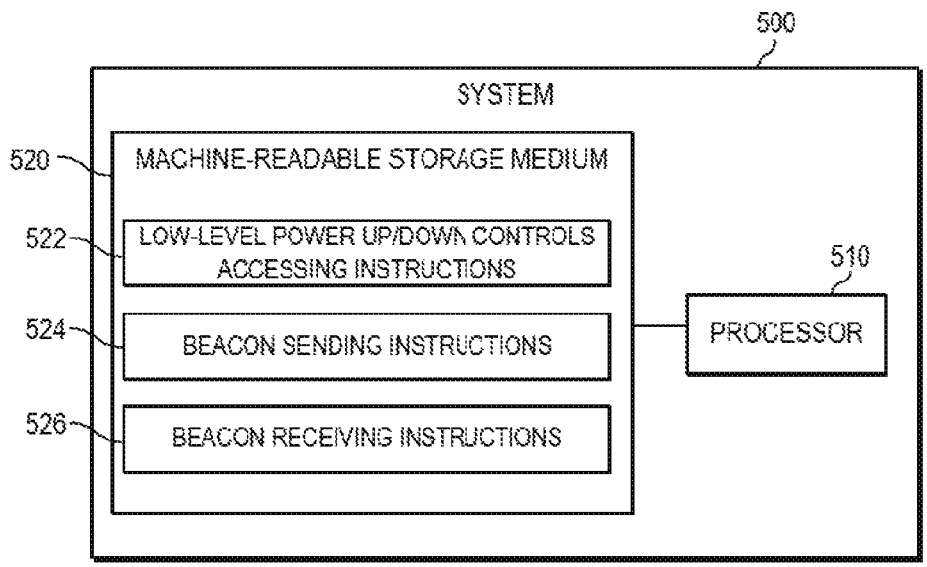
FIG. 5 is a block diagram of an example system for discovering connection of passive cables.

FIG. 5 is a block diagram of an example system 500 for discovering connection of passive cables. System 500 may be similar to system 100 of FIG. 1, for example. In some examples, the system may include a first subsystem and a second subsystem connected to each other (or connectable) by a passive cable. In the embodiment of FIG. 5, system 500 includes a processor 510 and a machine-readable storage medium 520. These may be located in the first subsystem, for example.

Processor 510 may be one or more central processing units (CPUs), microprocessors, and/or other hardware devices suitable for retrieval and execution of instructions stored in machine-readable storage medium 520. In the particular embodiment shown in FIG. 5, processor 510 may fetch, decode, and execute instructions 522, 524, 526, 528 to discover connection of passive cables. As an alternative or in addition to retrieving and executing instructions, processor 510 may include one or more electronic circuits comprising a number of electronic components for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within system 500, as shown in FIG. 5. In this situation, the executable instructions may be "installed" on the system 500. Alternatively, machine-readable storage medium 520 may be a portable, external or remote storage medium, for example, that allows system 500 to download the instructions from the portable/external/remote storage medium. In this situation, the executable instructions may be part of an "installation package". As described herein, machine-readable storage medium 520 may be encoded with executable instructions for discovering connection of passive cables.

Referring to FIG. 5, low-level power up/down controls accessing instructions 522, when executed by a processor (e.g., 510), may cause system 500 to access low-level power up/down controls of a signal driver/receiver in a first subsystem. The signal driver/receiver may be capable of sending and receiving data and signals over a passive cable to a connected second subsystem. Beacon sending instructions 524, when executed by a processor (e.g., 510), may cause system 500 to send, via the signal driver/receiver, beacons to the first subsystem over the passive cable to the second subsystem. Beacon receiving instructions 526, when executed by a processor (e.g., 510), may cause system 500 to receive, via the signal driver/receiver, beacons from the second subsystem over the passive cable. The sending and receiving may be performed via physical layer communication using the low-level power up/down controls.

The invention claimed is:

1. A system capable of discovering connection of passive cables, the system comprising:
   a first subsystem and a second subsystem, connectable to each other via a passive cable, each connected to a high-level management tool, and each including:
   a signal driver/receiver capable of sending and receiving data and signals over the passive cable; and
   a connection discovery device to access low-level power up/down controls of the signal driver/receiver to, via physical layer communication:

send a local unique identifier (ID) of the particular signal driver/receiver over the passive cable; and receive, over the passive cable, a remote unique ID of the signal driver/receiver in the other connected subsystem, wherein the connection discovery device is further to send the local unique ID and the remote unique ID to the high-level management tool, and wherein, to compare unique IDs received from the first and second subsystems, the high-level management tool is to:

concatenate the local unique ID and the remote unique ID received from the first subsystem;

flip the local unique ID and the remote unique ID received from the second subsystem and concatenate them; and compare the concatenated IDs from the first and second subsystems.

2. The system of claim 1, wherein each signal driver/receiver of the first and second subsystems is an electrical/optical (EO) device and the passive cable is a passive optical cable.

3. The system of claim 1, wherein the connection discovery device sends the local unique ID and receives the local unique ID before normal data communication begins between the first and the second subsystem over the passive cable.

4. The system of claim 1, wherein to send the local and remote unique IDs, the connection discovery device is further to modulate at least one of the low-level power up/down controls or monitor times of transitions on at least one of the low-level power up/down controls.

5. The system of claim 1, wherein to send the local and remote unique IDs, the connection discovery device is further to modulate at least one of the low-level power up/down controls to cause the signal driver/receiver to change between a high power output and a zero power output.

6. The system of claim 5, wherein the high power output is the same logic '1' used by the signal driver/receiver for normal data communication, and wherein the zero power output is a lower power level than the logic '0' used by the signal driver/receiver for normal data communication.

7. The system of claim 1, wherein the connection discovery device of each of the first and second subsystem is located in a local management processor of each subsystem.

8. The system of claim 1, wherein the high-level management tool compares the unique IDs received from the first subsystem and the second subsystem to discover that the first subsystem and second subsystem are connected via the passive cable.

9. A method of discovering connection of passive cables, the method comprising:

accessing controls of a signal driver/receiver in a first subsystem, wherein the signal driver/receiver is capable of sending and receiving data and signals over a passive cable to a connected second subsystem;

sending a local unique ID of the signal driver/receiver of the first subsystem over the passive cable to the second subsystem;

receiving, over the passive cable, a remote unique ID of a signal driver/receiver of the second subsystem, wherein the sending and receiving are performed via physical layer communication using the controls;

communicating the local unique ID and the remote unique ID to a high-level management tool, wherein the first and second subsystem are each connected to the high-level management tool; and comparing, by the high-level management tool, unique IDs received from the first and second subsystems, including:

concatenating a first unique ID and a second remote unique ID from the first subsystem;

flipping a first unique ID and a second unique ID from the second subsystem and concatenating them; and comparing the concatenated IDs from the first and second subsystems.

10. The method of claim 9, wherein the accessing, sending, receiving and communicating occur before normal data communication begins between the first and the second subsystem over the passive cable, wherein normal data communication is when data is being sent or received for the primary purpose for which the passive cable connection between the first and second subsystems exists.

11. The method of claim 9, wherein the signal driver/receiver of the first and the second subsystems is an electrical/optical (EO) device and the passive cable is a passive optical cable.

12. The method of claim 9, further comprising discovering that the first subsystem and second subsystem are connected via the passive cable.

13. The system of claim 1, wherein the passive cable is configured to not include a controller to transmit a stored unique ID identifying the passive cable to a receiving component.

14. The method of claim 9, wherein the passive cable is configured to not include a controller to transmit a stored unique ID identifying the passive cable to a receiving component.

* * * * *